(12) United States Patent
Muhlhoff et al.

(10) Patent No.: US 10,906,356 B2
(45) Date of Patent: Feb. 2, 2021

(54) TIRE TREAD COMPRISING A BLOCK HAVING A PLURALITY OF CUTOUTS

(71) Applicant: COMPAGNIE GENERALE DES ETABLISSEMENTS MICHELIN, Clermont-Ferrand (FR)

(72) Inventors: Olivier Muhlhoff, Clermont-Ferrand (FR); Benoit Durand-Gasselin, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 81 days.

(21) Appl. No.: 15/571,195

(22) PCT Filed: May 4, 2016

(86) PCT No.: PCT/FR2016/051056
§ 371 (c)(1),
(2) Date: Nov. 1, 2017

(87) PCT Pub. No.: WO2016/177974
PCT Pub. Date: Nov. 10, 2016

(65) Prior Publication Data
US 2018/0281526 A1    Oct. 4, 2018

(30) Foreign Application Priority Data
May 7, 2015    (FR) ..................... 15 54091

(51) Int. Cl.
*B60C 11/12*    (2006.01)
*B60C 11/03*    (2006.01)

(52) U.S. Cl.
CPC ...... *B60C 11/0306* (2013.01); *B60C 11/0304* (2013.01); *B60C 11/12* (2013.01);
(Continued)

(58) Field of Classification Search
CPC ............................. B60C 11/12; B60C 11/1236
See application file for complete search history.

(56) References Cited

U.S. PATENT DOCUMENTS 4,736,783 A * 4/1988 Motomura ............ B60C 9/2006
152/209.22
6,571,844 B1 * 6/2003 Ochi ...................... B60C 11/11
152/209.18
(Continued)

FOREIGN PATENT DOCUMENTS

CN    103182904    7/2013
CN    103832221    6/2014
(Continued)

OTHER PUBLICATIONS

Lexico, "Definition of rectilinear in English". https://www.lexico.com/en/definition/rectilinear accessed Mar. 17, 2020 (Year: 2020).*
(Continued)

*Primary Examiner* — Timothy Kennedy
*Assistant Examiner* — Alexander A Wang
(74) *Attorney, Agent, or Firm* — Cozen O'Connor

(57) ABSTRACT

Tire tread comprising elongate block (3) of rubbery material and extending in a circumferential direction of the tire. Elongate block (3) comprises a ground contact surface (5) delimited first and second lateral walls (7,9). Elongate block (3) comprises a plurality of oblique cutouts (11a, 11b) that open onto either the first or second lateral wall s and extend as far as cutout ends (13a, 13b) which do not open onto said lateral walls (7, 9). The cutouts of the plurality of cutouts (11a, 11b) are distributed over the contact surface (5) of the block such that when a cutout (11a) reaches its cutout end (13a), another cutout (11b) starts out from a lateral wall (9), at a same circumferential level (N) on the elongate block (3). The cutouts (11a, 11b) are sipes.

5 Claims, 3 Drawing Sheets

(52) U.S. Cl.
CPC ...... *B60C 11/1204* (2013.01); *B60C 11/1236* (2013.01); *B60C 2011/0358* (2013.01); *B60C 2011/0372* (2013.01); *B60C 2011/0383* (2013.01); *B60C 2011/1209* (2013.01)

(56) References Cited

U.S. PATENT DOCUMENTS

2012/0029114 A1* 2/2012 Francik ................ C08L 9/00
                                                        523/156
2013/0167997 A1   7/2013 Hayashi

FOREIGN PATENT DOCUMENTS

| EP | 0 324 605 | 1/1989 |
|----|-----------|--------|
| EP | 1 070 606 | 1/2001 |
| EP | 1 157 858 | 11/2001 |
| EP | 1 616 719 | 1/2006 |
| EP | 1 800 843 | 6/2007 |
| EP | 2 781 372 | 9/2014 |
| JP | 02-267008 | 10/1990 |
| JP | 2001 213122 | 8/2001 |
| JP | 53-95515 B2 | 1/2014 |
| WO | WO 2012/032144 | 3/2012 |

OTHER PUBLICATIONS

Office Action dated Dec. 4, 2018 issued in Chinese Patent Application No. 201680026096.6.

* cited by examiner

TIRE TREAD COMPRISING A BLOCK HAVING A PLURALITY OF CUTOUTS

RELATED APPLICATIONS

This is a U.S. National Phase Application under 35 USC 371 of International Application PCT/FR2016/051056 filed on May 4, 2016.

This application claims the priority of French application no. 15/54091 filed May 7, 2015, the entire content of which is hereby incorporated by reference.

FIELD OF THE INVENTION

The present invention relates to a tread for a motor vehicle tire provided with means for substantially reducing running noise.

BACKGROUND OF THE INVENTION

Usually, passenger vehicle tires are provided with a carcass reinforcement which nowadays is radial in the great majority of cases; in this configuration, the reinforcers of the carcass reinforcement are disposed so as to make an angle greater than or equal to 80 degrees and less than 100 degrees with a circumferential direction.

Moreover, tires are provided with a crown reinforcement comprising a plurality of reinforcers embedded in an elastomer-based material. This crown reinforcement is covered radially on the outside by a tread made of rubbery material, this tread having a surface, referred to as the tread surface, intended to be in contact with the road during running.

In order to ensure a level of safety that is essential when driving in the wet, notably, it is a known procedure to provide the tread with a plurality of longitudinal grooves of circumferential overall orientation.

One drawback with the presence of longitudinal grooves is the generation of vibrations in the air flowing through these grooves, notably in the region of contact with the road. These vibrations are the source of resonances that generate running noise.

The document EP0324605 discloses a tread comprising a plurality of blocks aligned in a circumferential direction. In that document, the blocks are inclined at a particular angle in order to reduce the generation of running noise.

The document WO2012032144 discloses a tread comprising a plurality of elongate blocks extending in the circumferential direction. Each elongate block comprises a plurality of sipes of transverse overall orientation in order to improve the grip of the tread, notably when braking on wet ground.

There is a need to limit the generation of noise by a tread comprising at least one elongate block extending in a circumferential direction.

Definitions

A "tire" means all types of resilient tread, whether or not it is subjected to an internal pressure.

The "tread" of a tire means a quantity of rubbery material delimited by lateral surfaces and by two main surfaces, one of which is intended to come into contact with a road surface when the tire is being driven on.

The "tread surface" means the set of points of the tread that are in contact with the road surface when the tire, inflated to its reference pressure, is driven on this road surface. The reference inflation pressure is defined under the use conditions of the tire as defined notably by the E.T.R.T.O. ("European Tire and Rim Technical Organisation") standard. The width C of the tread surface can notably be defined by the ETRTO standard such that $C=(1.075-0.005ar)*S^{1.001}$, where ar is the nominal aspect ratio and s is the theoretical section width on a measuring rim.

A "block" on a tread means a raised element delimited by grooves and comprising lateral walls and a contact face, the latter being intended to come into contact with the ground during running.

An "elongate block" means a block having a width and a length around the circumference of the tire, this length being much greater than the width.

A "rib" means an elongate block which extends around the entire circumference of the tire.

A "groove" means a cutout in the tread delimiting walls of material, the width of this cutout being such that the walls associated with this cutout cannot come into contact with one another under normal running conditions. The width of a groove is greater than 2 millimetres.

A "sipe" means a cutout in the tread delimiting walls of material, the width of this cutout being suitable for allowing the walls of the sipe to come at least partially into contact as they pass through the contact patch in which the tire is in contact with the ground. The width of a sipe is less than or equal to 2 millimetres.

A "transverse direction" or "axial direction" means a direction parallel to the axis of rotation of the tire.

A "circumferential direction" means a direction tangential to any circle centred on the axis of rotation. This direction is perpendicular to the axial direction.

An "oblique direction" means a direction that has an axial component and a circumferential component, neither of which is zero.

A "circumferential level" means a set of points that form a straight line, this straight line being perpendicular to the circumferential direction.

SUMMARY OF THE INVENTION

One aspect of the invention relates to a tire tread comprising at least one elongate block of rubbery material of width W and length L, where L>>W, this elongate block extending in a circumferential direction when the tread is mounted on the tire. The elongate block comprises a contact surface intended to come into contact with the ground and a first lateral wall and a second lateral wall delimiting this contact surface. The elongate block comprises a plurality, of oblique cutouts that open either onto the first lateral wall or onto the second lateral wall and extend as far as cutout ends which do not open onto said lateral walls. The cutouts of the plurality of cutouts are distributed over the contact surface of the block such that when a cutout, opening onto the first lateral wall, reaches its cutout end, another cutout starts out from the second lateral wall, at a same circumferential level on the elongate block. The cutouts are sipes.

An embodiment of the invention therefore proposes ensuring continuity in the organization of the cutouts in the elongate block. Specifically, when a cutout reaches one of its ends, another cutout starts out at the same circumferential level. This limits the variation in the void ratio in the circumferential direction in the elongate block and the acoustic performance of the tire is improved as a result.

In one variant embodiment, two adjacent cutouts in the elongate block overlap in transverse projection.

This thus increases the lengths of sipes in the elongate block, making it possible to improve the overall grip performance of the tire on wet ground.

In another variant embodiment, two adjacent cutouts do not overlap in transverse projection and the ends of these two cutouts are spaced apart from one another by a distance D, this distance D having a transverse component at least equal to 10% of the width W of the elongate block.

In this way, it is possible to have a continuous rubber part at the centre of the elongate block that is equal to at least 10% of the width W. This thus reinforces the mechanical strength of the elongate block.

In another variant embodiment, the cutouts have a curved shape at the contact surface.

By using cutouts with a curved shape, the overall appearance of the tread is made more attractive while at the same time the noise generated by the tire is limited.

In another variant embodiment, the cutouts comprise at least two parts with different inclinations.

By using complex cutouts comprising at least two parts with different inclinations, it is possible to improve the grip on wet ground both when cornering and when driving in a straight line.

In another variant embodiment, two adjacent cutouts in the elongate block have different inclinations and/or different shapes and/or different lengths.

This improves the scrambling of the sound signal emitted by the elongate block during running.

In another variant embodiment, the cutouts are sipes.

The grip of the tread on wet ground is improved while preserving a degree of overall stiffness of the elongate block.

In another variant embodiment, the cutouts are grooves.

On account of their dimensions, the grooves have a high capacity for evacuating water. By providing the outlet of the grooves alternately on the first lateral wall or on the second lateral wall of the elongate block, the disruption of the flow of water in the circumferential grooves delimiting these lateral walls is limited.

BRIEF DESCRIPTION OF THE DRAWINGS

Other features and advantages of the invention will become apparent from the following description, given by way of non-limiting example, with reference to the attached drawings in which.

DETAILED DESCRIPTION OF THE DRAWINGS

In the following description, elements which are substantially identical or similar will be denoted by identical references.

Figure 1:
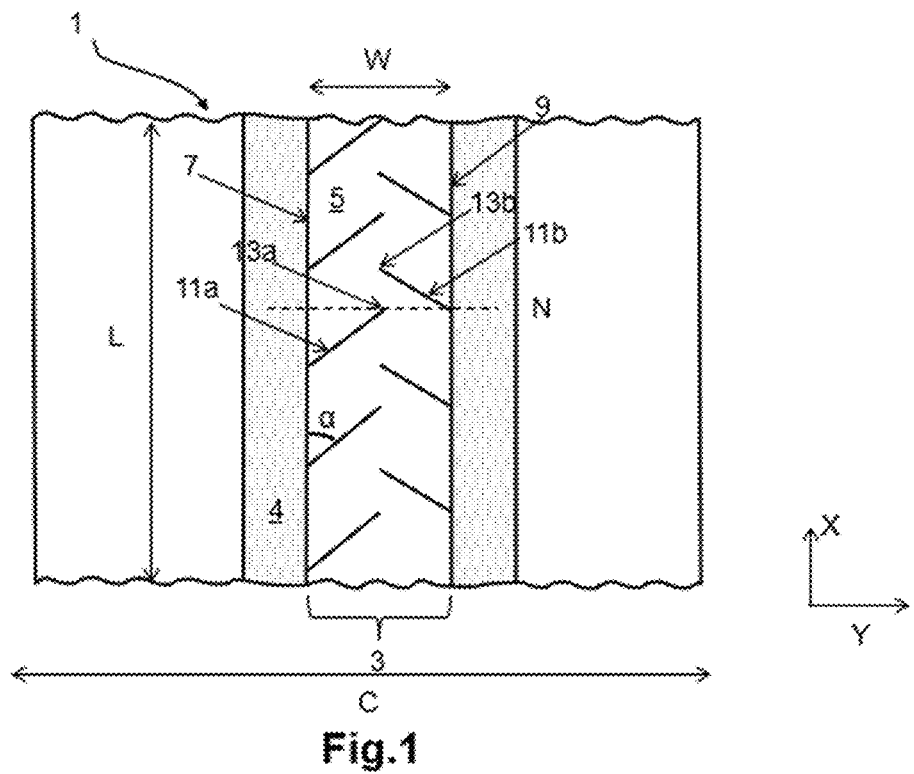
FIG. 1 schematically shows a partial view of a tread according to a first embodiment of the invention.

FIG. 1 shows a partial view of a tread 1 of a tire according to a first embodiment of the invention.

The tread 1 comprises at least one elongate block 3 of rubbery material. The elongate block 3 is delimited here by two grooves 4 which have been shaded grey in FIG. 1 in order to make the invention easier to understand. The elongate block 3 has a width W and a length L, this length L being much greater than the width W. Much greater means that the length L is at least equal to 5 times the width W. In this way, when the tread 1 is mounted on a tire, the elongate block 3 looks like a strip extending in a circumferential direction X. This strip may extend around the entire circumference of the tire and the elongate block then corresponds to a rib. Alternatively, this strip extends around only part of this circumference.

The elongate block 3 comprises a contact surface 5 intended to come into contact with the ground and a first lateral wall 7 and a second lateral wall 9 delimiting this contact surface 5. The elongate block 3 also comprises a plurality of oblique cutouts 11a, 11b that open either onto the first lateral wall 7 or onto the second lateral wall 9 and extend as far as cutout ends 13a, 13b which do not open out onto the lateral walls 7, 9.

The cutouts 11a, 11b are distributed over the contact surface 5 such that when a cutout 11a reaches its cutout end 13a, another cutout 11b starts out from a lateral wall 9, at a same circumferential level N on the elongate block 3. Thus, when the cutouts 11a, 11b are projected in the circumferential direction X, there is no overlapping of cutouts in this circumferential direction X. This limits the variation in the void ratio in the elongate block 3 in this circumferential direction. It will also be noted that, since the cutouts 11a, 11b do not open onto both lateral walls 7, 9 at the same time, good overall stiffness of the elongate block 3 is ensured.

The cutouts 11a, 11b reach their respective wall 7, 9 at an angle α to the elongate block.

In one non-limiting embodiment, the angle α is greater than or equal to 55°.

Figure 2:
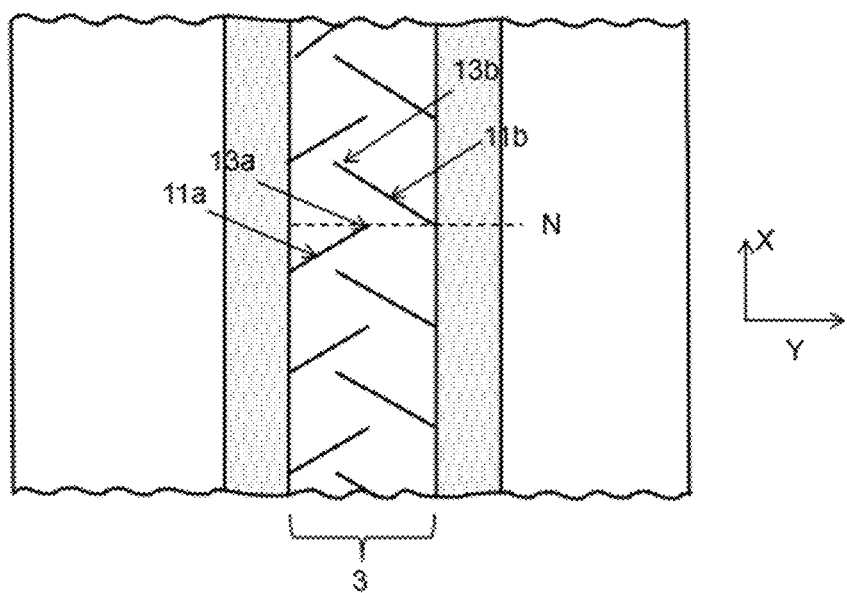
FIG. 2 schematically shows a second variant embodiment of the invention.

FIG. 2 depicts a variant embodiment in which at least one of the cutouts 11a, 11b is provided with a sufficient length such that these cutouts overlap in transverse projection, that is to say in the transverse direction Y.

Figure 3:
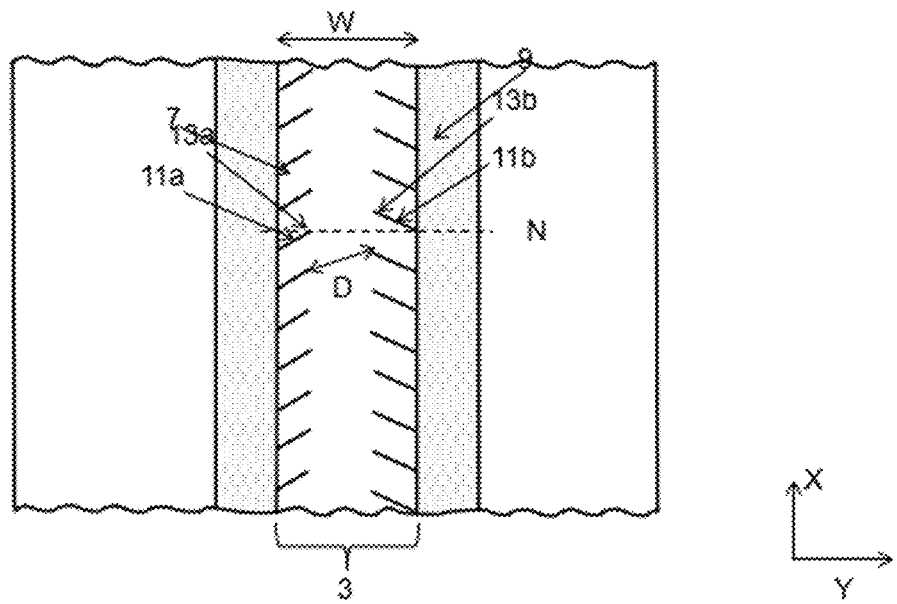
FIG. 3 schematically shows a third variant embodiment of the invention.

By contrast, FIG. 3 depicts a variant in which the lengths of the cutouts 11a, 11b are reduced. The ends 13a, 13b are then spaced apart by a distance D. This distance D has a transverse component at least equal to 10% of the width W of the elongate block.

Figure 4:
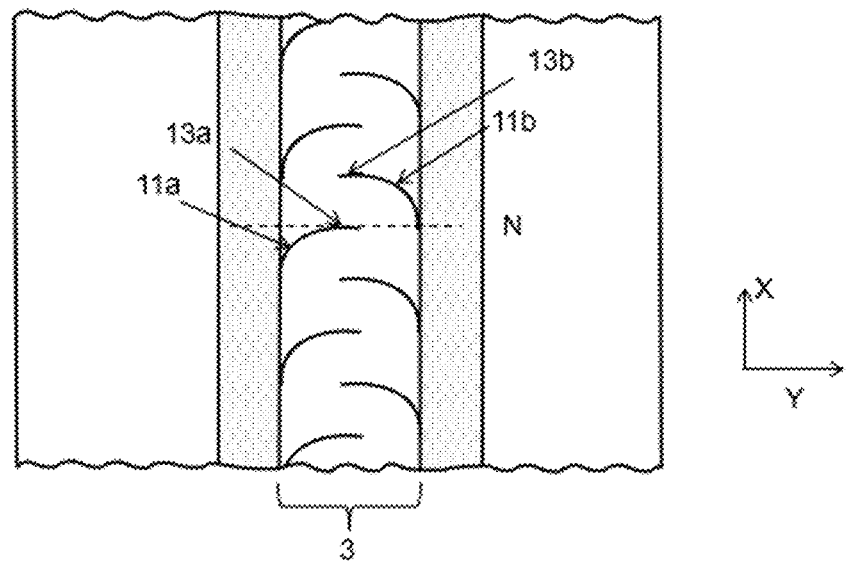
FIG. 4 schematically shows a fourth variant embodiment of the invention.

FIG. 4 depicts another variant embodiment, in which the cutouts have a curved shape.

In one non-limiting embodiment, the cutouts are complex and comprise at least two parts with different inclinations.

Figure 5:
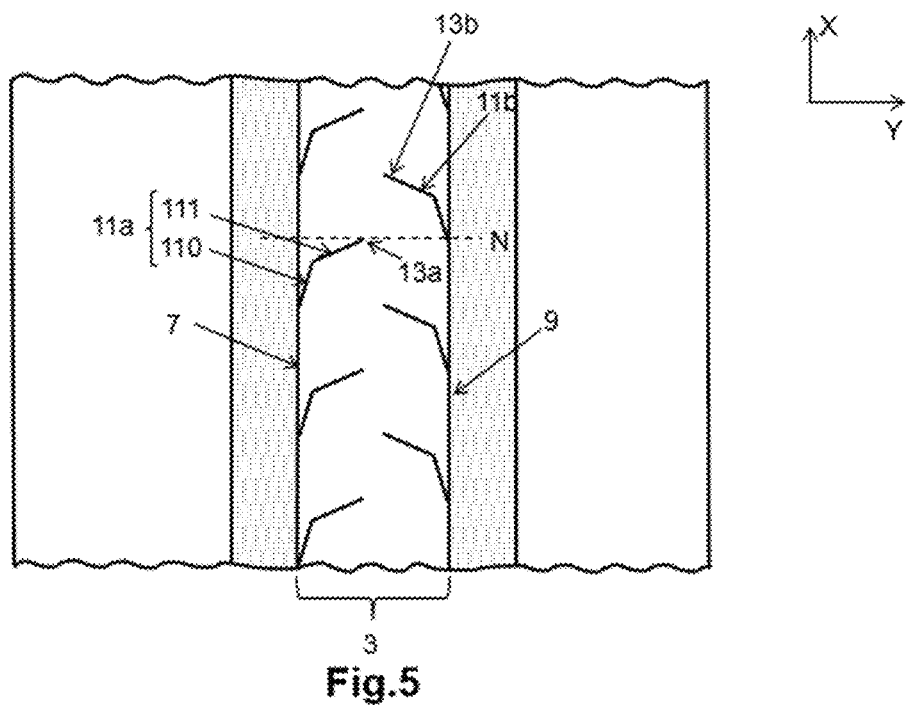
FIG. 5 schematically shows a fifth variant embodiment of the invention.

In another non-limiting embodiment that is illustrated in FIG. 5, the cutouts 11a comprise only a first part 110 and a second part 111. The first part 110 of the cutout 11a starts out from one of the lateral walls 7 of the elongate block, and the second part 111 continues the first part 110 in the direction of the other lateral wall 9. The first part 110 and the second part 111 have two different inclination angles.

Figure 6:
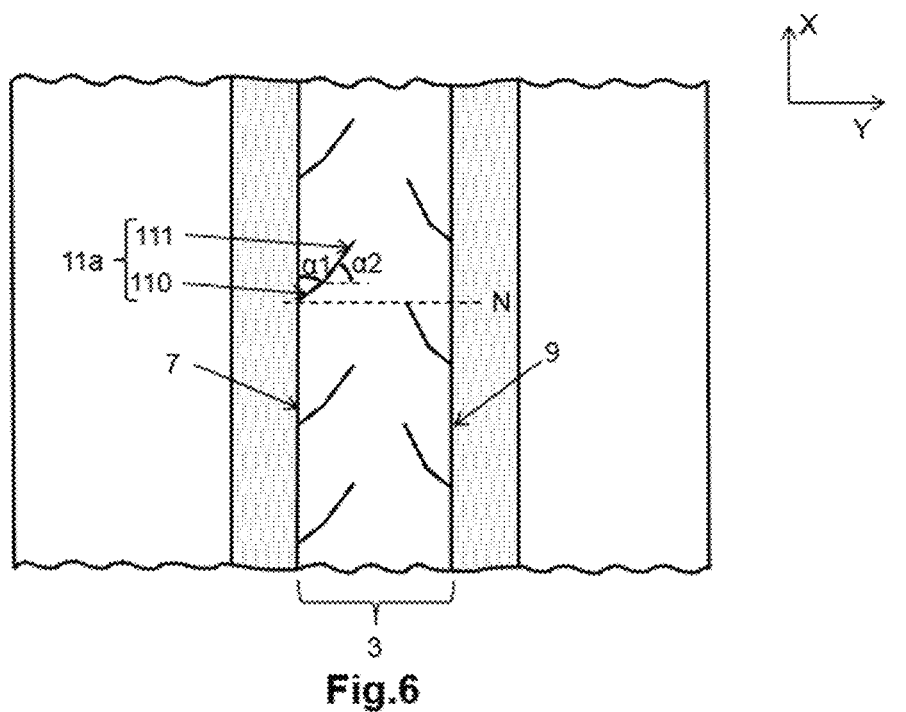
FIG. 6 schematically shows a sixth variant embodiment of the invention.

In one non-limiting embodiment that is illustrated in FIG. 6, the first part 110 of the cutout 11a makes a first angle α1 with the elongate block that is to say with the circumferential direction X. This first angle α1 is greater than or equal to 55°. This avoids the creation of a thin and fragile area of rubber between the cutout 11a and the lateral wall 7 of the elongate block.

In another embodiment, the second part 111 makes a second angle α2 with the transverse direction Y. This second angle α2 is greater than or equal to 55°.

The invention is not limited to the examples described and shown and various modifications can be made thereto without departing from its scope.

Thus, combinations of sipes having different inclinations and/or different shapes and/or different lengths are possible. The noticeable features of the tread pattern noise spectrum are decreased, and the scrambling of the sound signal emitted by the tread pattern of the tire is thus improved.

In another embodiment, it is possible, for example, to provide for the cutouts to be chamfered at the contact surface of the elongate block.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A tire tread comprising at least one elongate block of material comprising rubber, each said elongate block being of width W and length L, where L>>W, each said elongate block extending in a circumferential direction when the tread is mounted on a tire, each said elongate block comprising a contact surface adapted to come into contact with the ground and a first lateral wall and a second lateral wall delimiting this contact surface, each said elongate block comprising:
   a first plurality of first oblique cutouts each of which opens onto the first lateral wall,
   a second plurality of second oblique cutouts each of which opens onto the second lateral wall,
   wherein each of the first oblique cutouts extends as far as a first cutout end that does not open onto said second lateral wall, and each of the second oblique cutouts extends as far as a second cutout end that does not open onto said first lateral wall,
   wherein the first and second cutouts of the respective first and second plurality of cutouts alternately follow one another longitudinally over the contact surface of each said elongate block such that:
   in a case in which a first cutout, opening onto the first lateral wall, reaches its said first cutout end at a first circumferential level on any elongate block, a longitudinally adjacent second cutout starts out from the second lateral wall, at the same first circumferential level on that same elongate block as the first circumferential level of the respective first cutout end, and
   in a case in which a second cutout, opening onto the second lateral wall, reaches its said second cutout end at a second circumferential level on any elongate block, a longitudinally adjacent first cutout starts out from the first lateral wall, at the same second circumferential level on that same elongate block as the second circumferential level of the respective second cutout end,
   wherein the first and second cutouts are sipes, and are configured to have at least one arrangement selected from the group of:
   (a) none of the first cutouts overlap any of the second cutouts in a transverse direction,
   (b) each of the first oblique cutouts extends in a straight line from the first lateral wall to the first cutout end along a first single continuous oblique inclination, and each of the second oblique cutouts extends in a straight line from the second lateral wall to the second cutout end along a second single continuous oblique inclination, and
   (c) each of the first and second cutouts is arcuate in curvature at the contact surface.

2. The tread according to claim 1, wherein each of the first and second cutouts form an angle a with the circumferential direction, said angle a being greater than or equal to 55°.

3. The tread according to claim 1, wherein the cutout ends of any two of said first and second cutouts that follow one another longitudinally in the at least one elongate block are spaced apart from one another by a distance, this distance having a transverse component at least equal to 10% of the width W of the at least one elongate block.

4. The tread according to claim 1, wherein two adjacent cutouts in the at least one elongate block have different inclinations and/or different shapes and/or different lengths.

5. The tread according to claim 1, wherein the at least one elongate block is a rib.

* * * * *